(12) United States Patent
Rawdon et al.

(10) Patent No.: US 6,497,389 B1
(45) Date of Patent: Dec. 24, 2002

(54) AIRBAG SYSTEM AND METHOD FOR FACILITATING EMERGENCY EGRESS FROM AN AIRCRAFT

(75) Inventors: Blaine K. Rawdon, San Pedro, CA (US); Arthur V. Hawley, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/945,102

(22) Filed: Aug. 31, 2001

(51) Int. Cl.[7] .................. B64D 25/00; B66F 3/24
(52) U.S. Cl. ............ 244/138 R; 244/139; 244/140; 244/905; 254/93 HP
(58) Field of Search .................. 244/138 R, 139, 244/140, 905; 254/93 HD

(56) References Cited

U.S. PATENT DOCUMENTS

| | | | |
|---|---|---|---|
| 2,944,771 A | * 7/1960 | Bush ...................... 244/100 R |
| 3,565,398 A | 2/1971 | Floria et al. |
| 3,695,582 A | 10/1972 | Clay |
| 4,479,426 A | * 10/1984 | Olenfalk ...................... 100/195 |
| 4,560,145 A | 12/1985 | Widmer |
| 4,629,162 A | 12/1986 | Porché |
| 4,655,008 A | 4/1987 | Parish |
| 4,711,464 A | * 12/1987 | Bilas ......................... 180/209 |
| 4,783,096 A | 11/1988 | Ramsey et al. |
| 5,509,687 A | 4/1996 | Thorndike |
| 5,765,778 A | * 6/1998 | Otsuka .................... 244/100 A |
| 5,899,414 A | * 5/1999 | Duffoo ........................ 169/60 |
| 5,992,794 A | * 11/1999 | Rotman et al. ......... 244/138 R |
| 6,082,743 A | 7/2000 | Black |
| 6,237,875 B1 | * 5/2001 | Menne et al. ........... 244/100 A |
| 6,338,456 B1 | * 1/2002 | Cairo-locco et al. .... 244/100 A |
| 6,382,563 B1 | * 5/2002 | Chiu ........................... 244/120 |

* cited by examiner

Primary Examiner—Charles T. Jordan
Assistant Examiner—Stephen A Holzen
(74) Attorney, Agent, or Firm—Harness, Dickey & Pierce, P.L.C.

(57) ABSTRACT

An airbag system for elevating the fuselage of an aircraft off a landing surface a sufficient degree to allow for emergency egress of passengers and crew through ventral emergency exit doors. An airbag assembly made up of a plurality of independent airbags is disposed within the aircraft. When activated, the airbag system deploys the airbags external of the aircraft that elevate the fuselage of the aircraft a sufficient degree to allow for utilizing the ventral emergency exit doors on the fuselage to enable evacuating the passengers and crew. An activation mechanism is connected to the inflation.devices associated with each of the airbags. The activation mechanism generates an electrical signal which activates the inflation devices, which in turn fill the airbags with a compressed fluid, thus expanding the airbags and lifting the fuselage. A crew member initiates the activation of the airbag system through one or more switches.

10 Claims, 2 Drawing Sheets

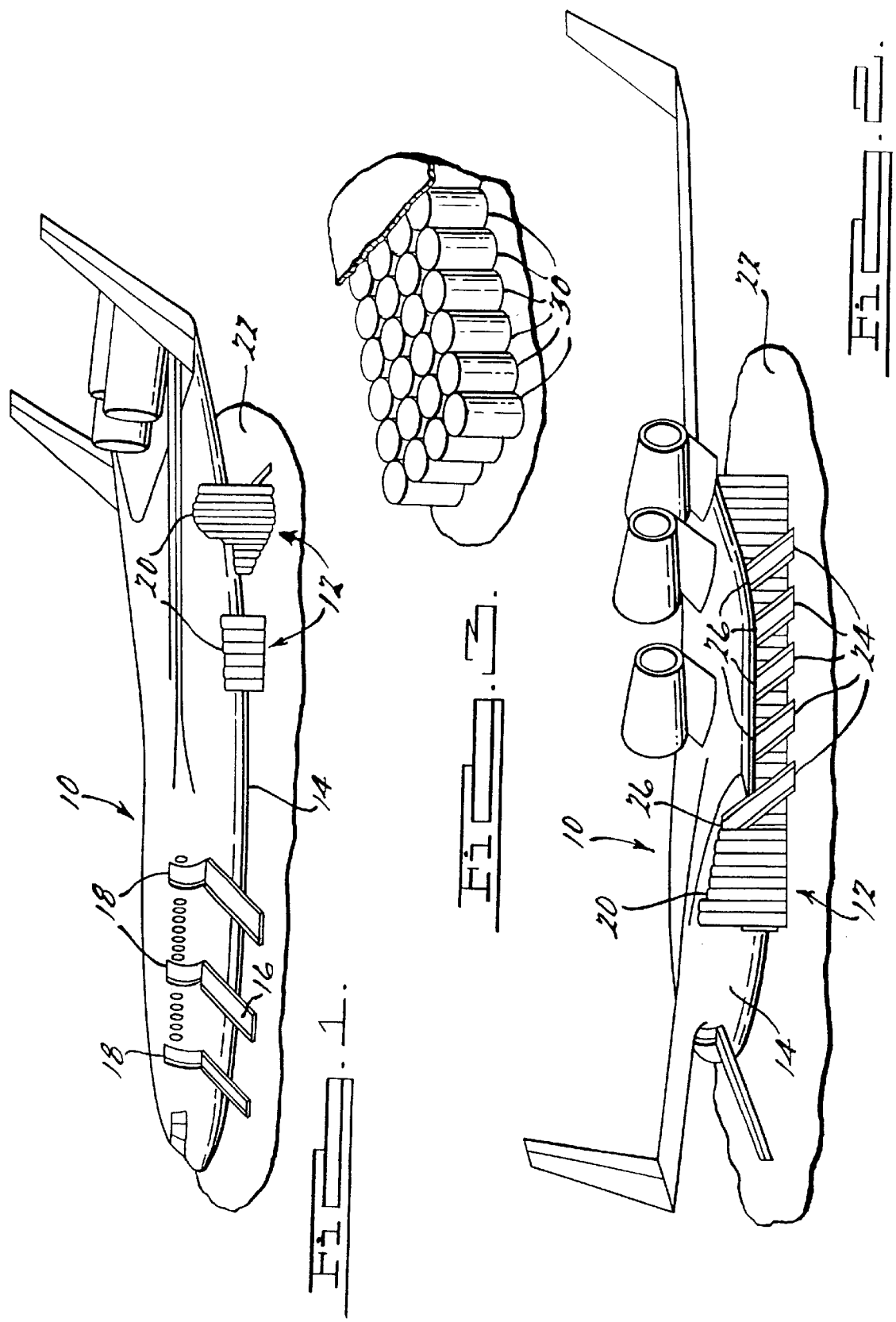

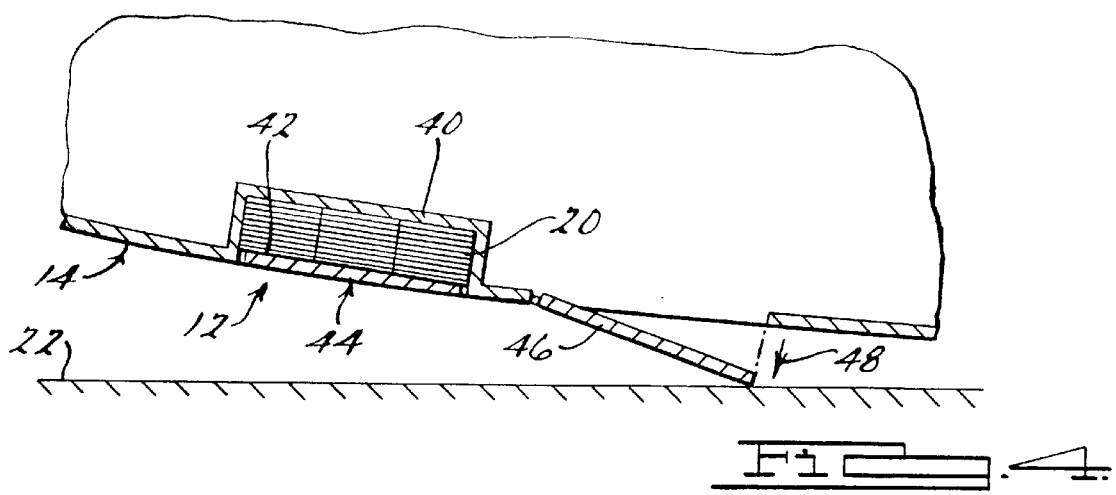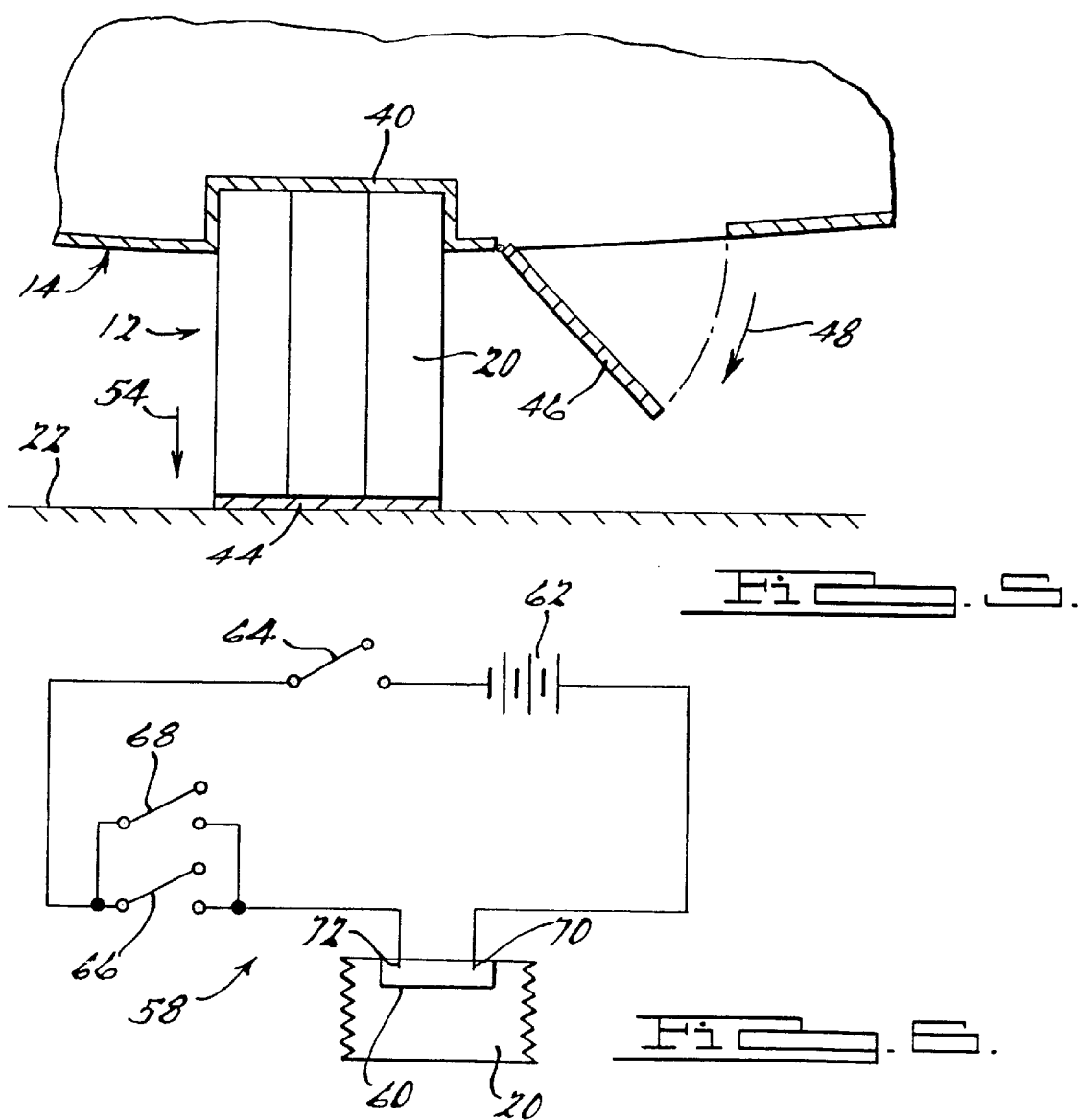

AIRBAG SYSTEM AND METHOD FOR FACILITATING EMERGENCY EGRESS FROM AN AIRCRAFT

GOVERNMENT INTERESTS

This invention was made with Government support under Contract Number NAS1-20275 awarded by NASA. The government has certain rights in this invention.

FIELD OF THE INVENTION

The present invention relates generally to airbags used for lifting vehicles and more particularly to an airbag adopted for elevating of the body of an aircraft in order to facilitate an emergency egress of passengers from the aircraft.

BACKGROUND OF THE INVENTION

It is essential on any transport aircraft that, in the event of a ground emergency, the crew and passengers are able to exit the aircraft in a very short period of time. The Federal Aviation Administration (FM) requires the complete evacuation of a commercial transport within specific time limits. The problem of emergency egress of an aircraft is compounded when, due to a malfunction of the landing gear, or the aircraft fuselage coming to rest in an abnormal position after an emergency landing, certain emergency exit doors cannot be effectively utilized because of the proximity of the fuselage to the ground. This potential problem is specifically relevant to aircraft utilizing a rear ventral emergency exit, such as aircraft with a blended wing-body design.

In a blended wing-body aircraft, emergency exit doors on the rear underside of the aircraft fuselage are designed to allow emergency egress of passengers and crew when the aircraft is supported above the ground by the landing gear. If the landing gear does not deploy fully or is damaged or is otherwise ineffective in elevating the aircraft fuselage, the ventral exit doors may be unusable because of the insufficient ground clearance of the fuselage relative to the ground. This is especially significant if the ventral exit doors open outward and are blocked from opening due to the proximity of the ground. However, even if opening the ventral exit doors is not an issue, clearance is needed to permit deployment of emergency exit devices such as slides or simply allow for the physical movement of persons through the ventral exit doorways. This situation can be resolved if a system can be provided to raise the aircraft to a level above the ground where the exit doors can be effectively utilized to allow expedient egress of passengers and crew.

Therefore, there is a need for a system that will temporarily elevate a fuselage of an aircraft off the landing surface to permit rapid evacuation of crew and passengers through the emergency exit doors of the aircraft in the event of a ground emergency.

A specific object of the invention is to provide a system that can provide clearance for effectively utilizing rear ventral exit doors by elevating the fuselage of the aircraft to allow adequate ground clearance to open and exit the rear ventral exit doors in the event of an emergency landing situation where the landing gear has not adequately deployed to elevate the fuselage of the aircraft.

For blended wing-body aircraft, it is another object of the invention to provide a system for allowing access to emergency exits and allowing passengers egress through exit doors in an expeditious manner after an emergency landing. It is yet another object of the invention to provide a system for blended wing-body aircraft that will allow for the installation of emergency exits near or along the lower surface and aft of the aircraft, without the risk of such exits being unusable due to a landing gear malfunction, damage or other ineffectiveness in elevating the aircraft upon landing.

SUMMARY OF THE INVENTION

The present invention is directed to an emergency airbag system for use with an aircraft. The system provides an airbag disposed within the aircraft that when activated deploys the airbag external to the fuselage of the aircraft for the purpose of elevating the fuselage of the aircraft. This ensures that emergency exit doors on the underside of fuselage have sufficient clearance to be utilized, despite the failure of the landing gear of the aircraft adequately elevate the aircraft, creating a situation where there would otherwise be insufficient clearance to use the emergency exit doors. The airbag is advantageously stowed within the aircraft to reduce aerodynamic drag caused by other systems designed to elevate the aft fuselage of an aircraft.

The invention makes use of an activation system which is connected to the airbag for the purpose of deploying the airbag. The activation system, in one preferred embodiment, includes a chemical cartridge that burns or rapidly changes form from a solid to a gas when ignited by an electrical signal. In an alternative embodiment, the activation system includes a fluid reservoir for storing a pressurized fluid that can be released into the airbag causing it to expand.

The activation system includes a switching system to prevent the deployment of the airbag in certain situations such as when the aircraft is in flight or when the landing gear is adequately extended. The switching system controls the application of power from an electrical power source that is also connected to the gas generating charge intended for deploying the airbag.

In operation, a flight attendant or crew member of the aircraft determines the necessity of deployment of the airbag system. Once the decision is made to deploy the system, the system is deployed by initiating the activation mechanism that inflates the airbags. Once the airbags are inflated, it provides clearance at the rear (i.e., aft) area of the aircraft by lifting the aft end of the fuselage a sufficient height off of the ground to allow the utilization of an emergency exit door for egress of passengers and crew members.

The aircraft emergency airbag system of the present invention may also be deployed in a manner to prevent the sinking of an aircraft in an emergency water landing (ditching) incident. Inflation of one or more of the airbags after such an incident would significantly improve the survivability of the crew and passengers by keeping the cabin above the water level and preventing the aircraft from sinking.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side perspective view of a blended wing-body aircraft with the airbag system of the present invention incorporated into its fuselage;

FIG. 2 is a rear perspective view of the blended wing-body aircraft of FIG. 1, depicting the airbags of the system in the deployed position with ventral emergency egress slides of the aircraft also in the deployed position;

FIG. 3 is a cross sectional view of the aircraft airbags of FIG. 1, depicting the aircraft airbags as an interconnected plurality of airbags;

FIG. 4 is cross sectional view of the blended wind-body aircraft in FIG. 1, depicting the airbag system in the fuselage of the aircraft in an undeployed state with a ventral emergency exit door in an inoperable state;

FIG. 5 is a cross sectional view of the aircraft airbag system of FIG. 1, depicting the aircraft airbags in a deployed state with a ventral emergency exit door in an operable state; and FIG. 6 is a schematic diagram of a preferred airbag activation mechanism and airbag inflation system of the airbag system of the present invention.

DETAILED DESCRIPTION OF THE PREFERRED EMBODIMENTS

The following description of the preferred embodiment(s) is merely exemplary in nature and is in no way intended to limit the invention, its application, or uses.

In FIG. 1, an aircraft 10 incorporating an airbag system 12 in accordance with the preferred embodiment of the present invention is shown. It will be appreciated immediately that while the aircraft 10 is illustrated as a blended wing-body aircraft, that the invention can be used with other aircraft which include ventral exit doors which could potentially be blocked by insufficient ground clearance in the event of a landing where the landing gear of the aircraft has failed to adequately elevate the aircraft, and the aircraft is resting on the ground in such a position as to impede the egress of passengers through the ventral exit doors. Therefore, the present invention should not be construed as being limited to use only with blended wing-body aircraft.

The airbag system 12 includes an airbag assembly 20, housed within the fuselage 14 of the aircraft 10. The airbag assembly 20, when fully deployed, presses against the ground 22 and elevates the aft end of the aircraft 10. Emergency exit slides 16 are deployed from emergency exit doorways 18 in the side of the fuselage 14 of the aircraft 10 for allowing the crew and passengers to exit the aircraft under normal de-planing conditions.

Referring to FIG. 2, the airbag assembly 20 extends along the aft end of the aircraft 10. Ventral emergency exit slides 24 descend from ventral emergency exit doorways 26 disposed in an undersurface of the fuselage 14 of the aircraft 10 to the ground 22. In a blended wing-body aircraft 10, ventral emergency exit doorways 26 allow for expedient egress of passengers from the aircraft 10 in the event of an emergency landing situation where the landing gear of the aircraft 10 has failed to adequately elevate the aircraft thus leaving the aircraft 10 in a position on the ground 22 where there would otherwise be insufficient ground clearance to effectively utilize the ventral emergency exit doorways 26.

Referring briefly to FIG. 3, the airbag assembly 20 is comprised of a plurality of individual airbags 30 connected together. This plurality of individual airbags 30 advantageously allows for potential failure of one or more airbags by providing redundancy in the airbags and airbag deployment system (to be described) that will allow for failure of some individual airbags 30 without effecting the overall ability of the aircraft airbag system 12 to elevate the aircraft 10. The number of individual airbags 30 used will depend upon their individual and combined lifting capacity together with the desired amount of redundancy in the airbag system 12. For example, two times the necessary number of airbags may be incorporated in the fuselage 14 of the aircraft 10 in order to allow a failure rate approaching fifty percent (50%) of the total number of individual airbags 30. Interconnecting the individual airbags 30 also advantageously provides stability from lateral movement and possible collapse of the airbag assembly 20 during and after delopyment.

Further, the interconnection and grouping of airbags 30 provides a large surface area on both the ground 22 and the aircraft 10 over which the weight of the aircraft 10 is distributed when elevated by the airbag system 12. This advantageously allows for lower pressure of the airbags 30 that will provide greater stability of the aircraft over uneven or soft ground 22.

Referring to FIG. 4, the airbag system 12 is contained within a suitable housing 40 of the fuselage 14 of the aircraft 10. The housing 40 may simply be formed from a plurality of suitably strong wall panels which cooperatively form a recess within which the airbag system 12 is supported. In an undeployed state the airbag assembly 20 is stored within the housing 40 and covered by a door panel 44 secured on its inner surface 42 to the individual airbags 30. It would also be possible to employ a suitable mechanism for positively latching the door panel 44 over its associated opening until the airbag system 10 is activated. A ventral emergency exit door 46 in the ventral emergency doorway 24 opens in a downward rotational direction 48 towards the ground 22. However, when the aircraft fuselage 14 is resting too close to the ground, such as after an emergency landing where the landing gear has not fully deployed, the ventral emergency exit door 46 is unable to open due to the close proximity of the ground 22. This condition is illustrated in FIG. 4. Such a condition would therefore prevent deploying of the emergency exit slides and evacuation of passengers and crew. It should be appreciated that the airbag system 12 would be effective in allowing emergency egress through the ventral emergency exit door 46 even if the ventral emergency exit door 46 opened inward or disconnected from the aircraft 10. Therefore, the airbag system 12 is intended to work with other types of emergency exit doors including those that open inward or detach.

It will also be appreciated that the housing 40 containing the aircraft airbag system 12 must be reinforced sufficiently to withstand the forces exerted by the airbag assembly 20 when the assembly is fully deployed and lifting the aircraft 10 away from the ground 22.

Referring now to FIG. 5, the airbag system 12 is expanded outwardly of the fuselage 14 in the downward direction 54 by inflating the airbag system 20 with a suitable medium. In the expanded state, the airbag assembly 20 urges the airbag door panel 44 against the ground 22, thus elevating the fuselage 14 of the aircraft 10 away from the ground 22. With the airbag assembly 20 in the expanded state, the ventral emergency exit door 46 is allowed to freely open in the direction of arrow 48 towards the ground 22. The elevation caused by the expansion of the airbag assembly 20 is sufficient to allow for opening of the ventral emergency exit door 46, and therefore for subsequent deployment of the emergency exit slide 24 associated with the exit door, to allow for emergency egress of passengers from the aircraft 10.

Referring to FIG. 6, an airbag activation mechanism 58 of the airbag system 12 is shown for activating a medium comprising an airbag gas generating charge device 60. In a preferred embodiment of the airbag system 12, each individual airbag 30 within the airbag assembly 20 includes its own gas generating charge device 60. Although only one charge device 60 is shown, in FIG. 6, in practice all of the devices 60 are coupled in parallel such that a single activation signal activates all of the charge devices 60 simultaneously.

The airbag gas generating charge device 60 is activated by an electrical current, applied to the device 60 by an electric power source 62 that is switchably connected to the charge device 60 by a first conductor 70 and a second conductor 72. The gas generating charge device 60 is activated by closing one or more switches 64, 66, 68 in order to deliver electric power from the electric power source 62 to the charge device 60.

For example, first switch 64 activates the airbag system 12 when it is closed by a crew member in the event of an emergency landing where the aircraft landing gear does not deploy or is otherwise ineffective in sufficiently elevating the aircraft 10 off the ground. A member of the aircraft 10 crew is responsible for determining when to activate the airbag system 12. The second switch 66 and the third switch 68 illustrate further restrictions on activating the airbag system 12. For example, the second switch 66 could be connected to the main landing gear such that the switch is open when all main landing gear are extended, but otherwise closed. Third switch 68 provides an override to the second switch 66 such that the second switch 66 can be overridden. Switch 68 is normally open but can be manually closed. It should be apparent that additional switches may be incorporated in the activation mechanism 58 in order to prevent the unintended deployment of the airbag system 12 under certain defined circumstances.

The airbag system 12 thus forms a means by which the fuselage of an aircraft can be quickly lifted after an emergency landing, and where the landing gear has not fully deployed, to enable opening of one or more emergency exit doors on the fuselage which could otherwise not be opened because of insufficient ground clearance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An airbag system for an aircraft adapted to lift a fuselage of the aircraft in the event of an emergency landing on a landing surface wherein a landing gear system of the aircraft has failed to lift the fuselage of the aircraft away from the landing surface a sufficient degree to allow the emergency egress of passengers through a ventral emergency exit doorway of the aircraft, wherein said airbag system comprises:
    an airbag disposed within the aircraft;
    an inflation system for inflating the airbag from a first unexpanded state, wherein the airbag is disposed within the aircraft, into a second expanded state wherein the airbag extends exterior of the aircraft; and
    an activation mechanism operably associated with the inflation system for activating the inflation system in response to a command from an individual, wherein the inflation system causes the airbag to deploy from the first unexpanded state into the second expanded state, and thus lift the fuselage a desired distance off of the landing surface to permit the emergency egress of passengers.

2. The airbag system of claim 1 wherein said inflation system comprises a plurality of inflation devices connected together so as to be activated simultaneously by said activation mechanism.

3. An airbag jack for lifting a fuselage of an aircraft for allowing the movement of an escape door in the fuselage from a closed position to an open position, wherein passengers in said aircraft can exit through said escape door in the event of landing of said aircraft where said escape door would not otherwise have clearance for opening, comprising:
    an inflatable member comprising a flexible material capable of withstanding pressurized inflation, wherein said inflatable member expands from an uninflated state into an inflated state upon the pressurized addition of a fluid into the inflatable member;
    a cavity in the fuselage of the aircraft for housing the inflatable member, wherein the inflatable member is housed within the cavity in the fuselage while in the uninflated state and expands to extend outside the cavity of the fuselage while in the inflated state; and
    an inflation system for inflating the inflatable member with a pressurized fluid.

4. The airbag jack of claim 3 wherein the inflatable member comprises a plurality of independent inflatable chambers that are positioned adjacent to one another to form a single, unitary structure.

5. The airbag jack of claim 3 wherein the inflation system comprises:
    a fluid generating device for generating a fluid in response to an electrical current;
    an electric power source switchably connected to the fluid generating device; and
    a switch for actuating on and off the flow of the electric current from the electric power source to the fluid generating device.

6. The airbag jack of claim 5 wherein said fluid generating device comprises a compressed fluid container comprising a compressed gas.

7. The airbag jack of claim 5 wherein said fluid generating device comprises a dry chemical container comprising a dry chemical wherein said dry chemical reacts with the electric current to produce a gas.

8. An airbag jack for elevating the fuselage of an aircraft off of a landing surface for allowing emergency egress of passengers through an emergency exit door in the fuselage that would otherwise be ineffective in allowing the emergency egress of the passengers, the airbag jack comprising:
    an inflatable member comprising an airtight flexible material capable of withstanding pressurized inflation, wherein said inflatable member expands from an uninflated state into an inflated state upon being filled with a pressurized fluid;
    a plurality of connected chambers within said inflatable member for providing stability to said inflatable member when said inflatable member is filled with a pressurized fluid; and
    an inflation system for inflating the inflatable member with a pressurized fluid;
    wherein the aircraft jack is disposed within the aircraft.

9. A method of elevating the fuselage of an aircraft off of a landing surface for allowing emergency egress of passengers through a ventral fuselage doorway after an emergency landing, the method comprising:
    using an inflatable member disposed within the aircraft, comprising airtight flexible material capable of withstanding pressurized inflation, and which is capable of expanding from an uninflated state into an inflated state projecting outwardly of the fuselage when filled with a pressurized fluid;

using a crew member to generate an activation signal to deploy said inflation member; and in response to said activation signal, causing said inflatable member to become inflated with a pressurized fluid to thereby lift said fuselage a sufficient distance off of said landing surface to permit emergency egress of passengers through the ventral fuselage doorway.

10. An aircraft with an airbag system disposed within a housing within the aircraft, said airbag system comprising:

an airbag assembly carried within the housing and comprised of a plurality of independent airbags wherein the airbags expand from an uninflated state into an inflated state upon being filled with a pressurized fluid;

an inflation system comprising a plurality of fluid sources in communication with said airbags, and an activation mechanism connected to the inflation system for activating the inflation system wherein said fluid sources fill the airbags with fluid, thus urging each of the airbags simultaneously from said uninflated state into said inflated state, wherein the airbag system can elevate said aircraft off of a landing surface.

* * * * *